United States Patent [19]

Alsop

[11] Patent Number: 4,671,927
[45] Date of Patent: Jun. 9, 1987

[54] NUCLEAR FUEL ROD CONTAINING A HYBRID GADOLINIUM OXIDE, BORON CARBIDE BURNABLE ABSORBER

[75] Inventor: Brian H. Alsop, Trafford, Pa.

[73] Assignee: Westinghouse Electric Corp., Pittsburgh, Pa.

[21] Appl. No.: 677,766

[22] Filed: Dec. 3, 1984

[51] Int. Cl.$^4$ .......................... G21C 3/02; G21C 7/04
[52] U.S. Cl. .................................. 376/419; 376/327; 252/636
[58] Field of Search ............... 376/414, 419, 421, 327; 252/636, 637, 638, 639, 640

[56] References Cited

U.S. PATENT DOCUMENTS

| | | | |
|---|---|---|---|
| 3,298,921 | 1/1967 | Bokros et al. .................. | 376/327 |
| 3,356,618 | 12/1967 | Rich et al. ....................... | 376/419 |
| 3,361,857 | 1/1968 | Rose . | |
| 3,759,786 | 9/1973 | Abate-Daja et al. ........... | 376/419 |
| 3,855,061 | 12/1974 | Triggiani et al. ............... | 376/419 |

FOREIGN PATENT DOCUMENTS 59-90082  5/1984  Japan ................................ 376/419

Primary Examiner—Deborah L. Kyle
Assistant Examiner—Richard L. Klein
Attorney, Agent, or Firm—D. M. Satina

[57] ABSTRACT

A nuclear fuel rod contains nuclear fuel pellets that have incorporated therein a hybrid burnable absorber that affects a moderation of the burn-out rate of the system containing the rod. The nuclear fuel pellets contain 1 to 20 percent by weight gadolinium oxide and 0.02 to 1.0 percent by weight of boron carbide particles of a size between 20 to 100 microns in diameter, the particles coated with a 0.5 to 10 micron thick coating of a helium gas-impervious coating.

20 Claims, 2 Drawing Figures

NUCLEAR FUEL ROD CONTAINING A HYBRID GADOLINIUM OXIDE, BORON CARBIDE BURNABLE ABSORBER

FIELD OF THE INVENTION

The present invention relates to an improved nuclear fuel rod with a burnable absorber, consisting of a combination of gadolinium oxide and boron carbide particles coated with a helium impervious material, incorporated in the fissionable fuel.

BACKGROUND OF THE INVENTION

It is well-known that the process of nuclear fission involves the disintegration of the fissionable fuel material, usually enriched uranium dioxide, into two or more fission products of lower mass number. Among other things, the process also includes a net increase in the number of available free neutrons which are the basis for a self-sustaining reaction. When a reactor has operated over a period of time, the fuel assembly with fissionable material must ultimately be replaced due to depletion. Inasmuch as the process of replacement is time consuming and costly, it is desirable to extend the life of a given fuel assembly as long as practically feasible. For that reason, deliberate additions to the reactor fuel of parasitic neutron-capturing elements in calculated small amounts may lead to highly beneficial effects on a thermal reactor. Such neutron-capturing elements are usually designated as "burnable absorbers" if they have a high probability (or cross-secton) of absorbing neutrons while producing no new or additional neutrons or changing into new absorbers as a result of neutron absorption. During reactor operation, the burnable absorbers are progressively reduced in amount so that there is a compensation made with respect to the concomitant reduction in the fissionable material.

The life of a fuel assembly may be extended by combining an initially larger amount of fissionable material as well as a calculated amount of burnable absorber. During the early stages of operation of such a fuel assembly, excessive neutrons are absorbed by the burnable absorber which undergoes transformation to elements of low neutron cross-section which do not substantially affect the reactivity of the fuel assembly in the latter period of its life when the availability of fissionable material is lower. The burnable absorber compensates for the larger amount of fissionable material during the early life of the fuel assembly, but progressively less absorber captures neutrons during the latter life of the fuel assembly, so that a long life at relatively constant fission level is assured for the fuel assembly. Accordingly, with a fuel assembly containing both fuel and burnable absorber in carefully proportioned quantity, an extended fuel assembly life can be achieved with relatively constant neutron production and reactivity.

The incorporation of burnable absorber in fuel assemblies has been recognized in the nuclear industry as an effective means of increasing fuel capacity and thereby extending core life. Burnable absorbers are used either uniformly mixed with the fuel (i.e., distributed absorber) or are placed discretely as separate elements in the reactor, as separate burnable absorber rods, so arranged that they burn out or are depleted at about the same rate as the fuel. Thus, the net reactivity of the core is maintained relatively constant over the active life of the core.

Among the various burnable absorbers that have been mixed with fuel as a distributed absorber, gadolinium oxide has been found to be an excellent absorber due to its extremely high thermal absorption cross-section. Enriched uranium dioxide, with a high U-235 isotope content, and gadolinium oxide, as a mixture, has thus been previously used in formation of nuclear fuel pellets.

Where gadolinium oxide is used as the burnable absorber in fuel pellets, a disadvantage exists in that the absorbing quality of the gadolinium oxide is relatively stable over a period of time but then decreases very quickly and is lost. In effect, the burn-out rate of gadolinium oxide is faster than desired. Also, a problem exists where higher amounts of gadolinium oxide are added to uranium dioxide in the manufacture of fuel pellets because of physical limitations such as clumping of the material during fabrication. The use of sintered microspheres of gadolinium oxide in a nuclear fuel has been suggested in U.S. Pat. No. 3,759,786, which discusses the use of coated gadolinium oxide bodies, such as molybdenum coated gadolinium oxide, prepared in microsphere form, as consumable absorbers in uranium dioxide. Uranium borides and borides of metals having a low neutron-capturing section, such as zirconium, prepared in microsphere form are also suggested for incorporation into uranium dioxide.

Boron compounds, such as boron carbide are also known for use as burnable absorbers. While boron compounds containing the isotope $B^{10}$ are usable as burnable absorbers, they do not have the absorption of gadolinium oxide and thus must be provided in larger amounts, which thus must displace some fuel in pellets. Also, boron when used as a burnable absorber produces helium gas during burn-out, which gas produces undesirable pressures within the fuel element. In instances where boron compounds have been used in separate burnable poison rods, in conjunction with conventional fuel rods, coated boron carbide has been used, with a coating over the boron carbide particles to contain such helium. U.S. Pat. No. 3,356,618, for example, teaches the formation of coated boron particles where the boron particles have an inert coating, such as a carbide, nitride or carbo-nitride of a refractory metal such as zironium, formed thereon and the coated particles are dispersed in a metal matrix, such as iron, cobalt, nickel, aluminum and zirconium, for use in neutron absorption control elements for a nuclear reactor. In U.S. Pat. No. 3,855,061, which relates to a nuclear fuel plate containing microspheroidal particles of a fuel, the fuel particles may be coated with niobium, nickel, alumina, pyrolytic graphite or other materials. This patent also suggests that the microsphere route can be used to introduce nuclear poisons such as gadolinium or samarium to a fuel, or introduction of microspheres of a neutron poison, or neutron moderating materials such as boron carbide to the fuel when desired.

It is an object of the present invention to provide a nuclear fuel element which combines the benefits of gadolinium oxide and boron carbide as absorbers in a single fuel pellet.

It is another object of the present invention to provide a nuclear fuel which exhibits improved nuclear reactor power distribution control than is provided by the use of gadolinium oxide alone as a burnable absorber.

SUMMARY OF THE INVENTION

A nuclear fuel rod assembly has a fuel rod that contains a hybrid burnable absorber-nuclear fuel composition. Pellets of a fissionable material, such as uranium dioxide, contain gadolinium oxide and coated boron carbide particles. The boron carbide particles are present in the pellet in an amount of between about 0.02 to 1.0 percent by weight of the pellet and are of a particle size of between 20 to 100 microns in diameter. The coating on the boron carbide pellets is about 0.5 to 10 microns in thickness and is a helium gas-impervious coating, such as niobium, nickel, zirconium, or the like.

DETAILED DESCRIPTION

The present invention provides a hybrid burnable absorber-containing nuclear fuel composition and fuel rod assemblies containing such a composition which combines the benefits of both gadolinium oxide and boron carbide as absorbers into a single fuel pellet.

Figure 1:
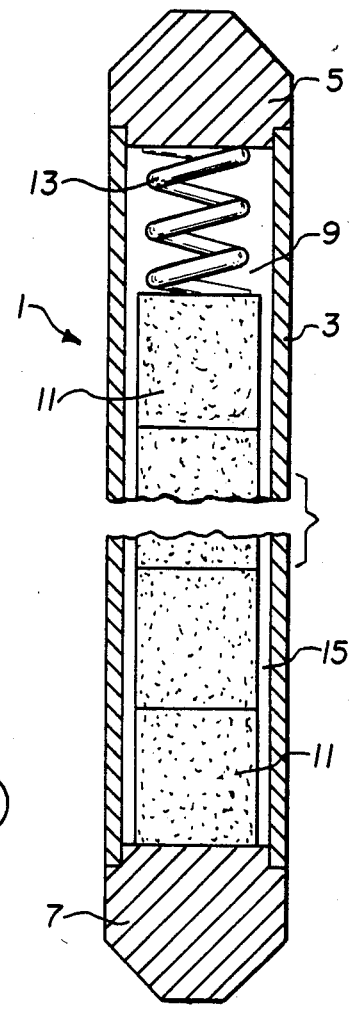
FIG. 1 is a schematic cross-sectional view of a nuclear fuel rod of the present invention.

As illustrated in FIG. 1, a nuclear fuel rod 1, for use in a nuclear fuel rod assembly, comprises a metallic elongated tubular cladding 3, usually formed from zirconium alloys, having a top end plug 5 and a bottom end plug 7 which provides an enclosed chamber 9. In the enclosed chamber 9, a plurality of fissionable fuel pellets 11 are disposed in end-to-end abutment biased against the bottom end plug 7 by the action of a spring 13. It is the fissionable fuel pellets 11 that are formed containing the hybrid burnable absorber according to the present invention. The diameter of the pellets 11 is slightly smaller than the interior diameter of the tubular cladding 3 such that a clearance space 15 is provided therebetween. Both the spring 13 and the clearance space 15 accommodate thermal expansion of the pellets 11 during operation.

The nuclear fuel is preferably uranium in the form of uranium dioxide enriched in the U-235 isotope. In place of the use of enriched uranium dioxide, a mixture of uraniumplutonium dioxide may be used.

The nuclear fuel composition of the present invention includes the nuclear fuel, preferably uranium dioxide, in admixture with gadolinium oxide and coated boron carbide particles. These materials are mixed together, compacted to the desired size and shape and sintered to produce dense pellets for use in a nuclear fuel rod. The nuclear fuel pellets, typically having dished ends and chamfered edges, will normally by cylindrical in shape with a length of about 0.4–0.6 inch, and a length to diameter ratio of less than 1.7:1, and preferably of about 1.2:1.

The nuclear fuel pellets, in addition to the uranium dioxide contain between 1 to 20 percent by weight gadolinium oxide, based on the weight of the pellet. As previously described, the incorporation of gadolinium oxide, as a burnable absorber, into a fissionable material for use as fuel pellets is known. Generally, the preferred amount of gadolinium oxide used in the pellets of the present invention will preferably be between about 2 to 10 percent.

In addition to the gadolinium oxide, there is added to the fuel composition between about 0.02 to 1.0 percent by weight of coated boron carbide particles. The boron carbide particles are of a size in the range of betwen 20 to 100 microns in diameter and have a coating thereon of a thickness of between 0.5 to 10 microns. A coating thickness of about 5 microns on the boron carbide particles is preferred. The coating on the boron carbide particles is of an attrition resistant, helium impervious coating material. Such materials are known, for example, a coating of niobium, zirconium, nickel, graphite, alumina, and the like. Such coated boron carbide particles may be produced by various methods and are commercially available. It is believed that such coated particles have been previously prepared for use in separate burnable absorber rods of a nuclear reactor system. The coating prevents helium gas, formed during operation of a reactor, from escaping to the environment within the rod outside the coated particles.

In formation of the pellets 11, conventional nuclear fuel pellet formation techniques are used. The uranium dioxide, gadolinium oxide, and coated boron carbide particles are intimately mixed, the mixture compacted to the desired shape and size, and the pellets sintered to produce nuclear fuel pellets containing a hybrid burnable absorber composition throughout the pellet.

Figure 2:
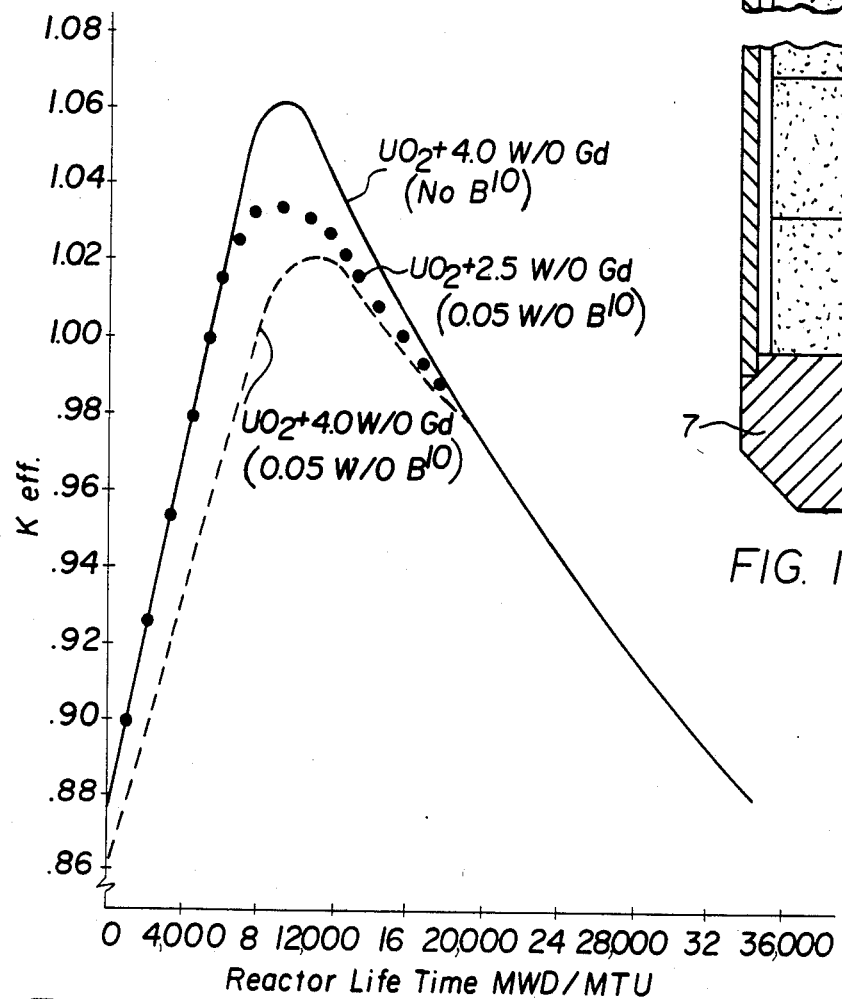
FIG. 2 is a graph representing the life of a reactor using gadolinium oxide alone as a burnable absorber in comparison with the use of the hybrid absorber of the present invention.

The benefits of use of the pellets of a nuclear fuel containing the hybrid burnable absorber composition is graphically illustrated in FIG. 2, which shows the results of neutronics spatial calculations using the PHOENIX transport-depletion code. This code is described in the literature and used in FIG. 2 relative to a pressurized water reactor containing about a 3 percent enrichment of uranium dioxide fuel. In FIG. 2, the effective reactivity constant (Keff) is plotted against the reactor lifetime as measured by megawatt days/metric tons of uranium (MWD/MTU). The full-line represents the rate of burn-out with use of uranium dioxide pellets containing 4 percent by weight (4.0 w/o) of gadolinium and no boron carbide (containing $B^{10}$). The dash-line curve represents the rate of burn-out with use of uranium dioxide pellets containing a hybrid burnable absorber consisting of 4 percent by weight (4.0 w/o) of gadolinium oxide and 0.05 percent by weight (0.05 w/o) of the boron isotope, $B^{10}$, corresponding to the presence of about 0.3 percent by weight of boron carbide. As illustrated, the addition of only 0.05 w/o of $B^{10}$ (~0.3 w/o $B_4C$) will cause the burn-out rate to be delayed about 2000 MWD/MTU (megawatt days/metric tons of uranium). This is equivalent to increasing gadolinium enrichment 1.5 w/o. Higher amounts of boron carbide would result in proportionally greater burn-out delays. Also, it should be noted that the peak reactivity value is reduced about 4 percent $\Delta K$. This is equivalent to reducing assembly powers 10 to 16 percent. Gadolinium burnable absorber assemblies generally limit the core at their peak reactivity time in life. Thus, the present hybrid burnable absorber fuel pellets will substantially reduce the power peaking control problems associated with gadolinium. The final line on the graph, the dotted line, illustrates an intermediate fuel-hybrid absorber composition containing 2.5 percent by weight (2.5 w/o) of gadolinium oxide and 0.05 percent by weight (0.05 w/o) of $B^{10}$.

In addition to providing moderation of the burn-out rate of a gadolinium-containing fuel pellet, the residual penalty of the hybrid burnable absorber rod is less than a standard boron carbide rod and only slightly higher than a gadolinium rod with the same weight percent of absorber. The residual penalty may be described as the affect of minor amounts of undepleted absorber in the fuel on the lifetime of the reactor before refueling is required. When absorber is added to the fuel, some absorber will still remain active after the desired time has passed for its use, and will thus compete with the fuel in absorbing neutrons. With the present hybrid burnable absorber composition the reduction in the loading of gadolinium possible by trading off gadolinium and boron carbide loadings could result in a product with even less residual penalty than either a gadolinium-containing fuel rod or a boron carbide-containing fuel rod alone. Thus, the use of the gadolinium oxide - boron carbide hybrid absorber in uranium dioxide could provide a synergistic effect and provide a lower residual penalty than the use of comparable amounts of either gadolinium oxide or boron carbide by themselves.

What is claimed is:

1. A nuclear reactor fuel rod assembly having a fuel rod containing a hybrid burnable abosorber-containing nuclear fuel, said fuel rod having a predetermined absorption capability, said fuel assembly comprising:

a nuclear fuel pellet containing a fissionable material and a hybrid absorber material, said hybrid absorber material comprising gadolinium oxide, and coated boron carbide particles, said boron carbide particles being of a particle size of between 20 to 100 microns in diameter and each coated by 0.5 to 10 micron coating of a helium gas-impervious material, the total weight percent of hybrid absorber material in said fuel pellet being less for a fuel rod having the predetermined absorption capability of said fuel rod assembly than the total weight percent of gadolinium oxide required when used without boron carbide and of the total weight percent of boron carbide required when used without gadolinium oxide.

2. A nuclear reactor fuel rod assembly as defined in claim 1 wherein said nuclear fuel pellet contains 1 to 20 percent by weight of said gadolinium oxide.

3. A nuclear reactor fuel rod assembly as defined in claim 2 wherein said gadolinium oxide is present in an amount of between 2 to 10 percent by weight of the pellet.

4. A nuclear reactor fuel rod assembly as defined in claim 2 wherein said boron carbide particles are present in an amount of between 0.02 to 1.0 percent by weight of said pellet.

5. A nuclear reactor fuel rod assembly as defined in claim 4 wherein said coating is a helium gas-impervious material selected from the group consisting of nickel, zirconium, niobium, graphite and alumina.

6. A nuclear reactor fuel rod assembly as defined in claim 4 wherein said fissionable material is uranium dioxide.

7. A nuclear reactor fuel rod assembly as defined in claim 6 wherein said pellet is cylindrical in shape with a length of between 0.4 to 0.6 inch, and a length to diameter ratio of less than 1.7:1.

8. A nuclear reactor fuel rod assembly having a fuel rod containing a hybrid burnable absorber-containing nuclear fuel, said fuel rod having a predetermined burn out rate, said fuel rod assembly comprising:

a nuclear fuel pellet comprising uranium dioxide containing a hybrid absorber comprising 2 to 10 weight percent of the pellet of gadolinium oxide, and 0.02 to 1.0 weight percent of coated boron carbide particles, said boron carbide particles being of a particle size of between 20 to 100 microns in diameter and each coated by a 0.5 to 10 micron coating of a helium gas-impervious material, the addition of a predetermined weight percent of boron carbide particles to said fuel rod acting to reduce the amount of gadolinium oxide required in said fuel rod to achieve said predetermined burn out rate by an amount greater than said predetermined weight percent of boron carbide particles.

9. A nuclear fuel rod, for use in a nuclear reactor fuel rod assembly, the fuel rod having a predetermined burn out rate and having a plurality of hybrid burnable absorber-containing fissionable fuel pellets contained within a metallic elongated tubular cladding, said hybrid burnable absorber-containing fuel pellets consisting essentially of a fissionalbe material, gadolinium oxide in an amount of between 1 to 20 percent by weight, and 0.02 to 1.0 percent by weight of boron carbide particles, said boron carbide particles being of a particle size of between 20 to 100 microns in diameter and each coated by a 0.5 to 10 micron coating of a helium gas-impervious material, the addition of a predetermined weight percent of boron carbide particles to said fuel pellets acting to reduce the amount of gadolinium oxide required to achieve said predetermined burn out rate in said fuel rod by an amount greater than said predetermined weight percent of boron carbide particles.

10. A nuclear fuel rod as defined in claim 9 wherein said fissionable material is uranium dioxide.

11. A nuclear fuel rod as defined in claim 10 wherein said gadolinium oxide is present in an amount of 2 to 10 weight percent.

12. A nuclear fuel rod as defined in claim 11 wherein said helium gas-impervious material is selected from the group consisting of nickel, zirconium, niobium, graphite and alumina.

13. A nuclear fuel rod as defined in claim 9 wherein said pellet is in the form of a cylindrical pellet having a length of between 0.4 to 0.6 inch, and a length to diameter ratio of less than 1.7:1.

14. An improved nuclear fuel rod containing gadolinium oxide absorber material, for use in a nuclear reactor fuel rod assembly, the fuel rod having a plurality of hybrid burnable absorber-containing fissionable fuel pellets contained within a metallic elongated tubular cladding, said hybrid burnable absorber-containing fuel pellets consisting essentially of pellets of uranium dioxide containing between 2 to 10 weight percent of gadolinium oxide and 0.02 to 1.0 weight percent of coated boron carbide particles, said boron carbide particles being of a particle size of between 20 to 100 microns in diameter and each coated by a 0.5 to 10 micron coating of a helium gas-impervious material, the addition of a predetermined weight percent of said boron carbide particles to the gadolinium oxide containing fuel pellets acting to delay the burn out rate of said fuel rod to a burn out rate which would require the addition of a greater weight percent of gadolinium oxide than the predetermined weight percent of boron carbide particles added.

15. A nuclear reactor fuel composition, containing an hybrid burnable absorber, for use in fuel rod assemblies of a nuclear reactor, consisting essentially of a fissionable material, gadolinium oxide in an amount of between 1 to 20 percent by weight of the composition, and 0.02 to 1.0 percent by weight of boron carbide particles, said boron carbide particles being of a particle size of between 20 to 100 microns in diameter and each coated by a 0.5 to 10 micron coating of a helium gas-impervious material, the addition of boron carbide particles as well as gadolinium oxide absorber material to said fissionable material resulting in a fuel composition having less weight percent of absorber material than a fuel composition having the same absorption capabilities but having only gadolinium oxide or only boron carbide absorber material.

16. A nuclear fuel composition as defined in claim 15 wherein said fissionable material is uranium dioxide.

17. A nuclear fuel composition as defined in claim 16 wherein said gadolinium oxide is present in an amount of 2 to 10 weight percent.

18. A nuclear fuel composition as defined in claim 17 wherein said helium gas-impervious material is selected from the group consisting of nickel, zirconium, niobium, graphite and alumina.

19. A nuclear fuel composition as defined in claim 15 wherein said composition is in the form of a cylindrical pellet having a length of between 0.4 to 0.6 inch, and a length to diameter ratio of less than 1.7:1.

20. An improved nuclear fuel composition, containing a hybrid burnable absorber, for use in fuel rod assemblies of a nuclear reactor, consisting essentially of a pellet of uranium dioxide containing between 2 to 10 weight percent of gadolinium oxide and 0.02 to 1.0 weight percent of coated boron carbide particles, said boron carbide particles being of a particle size of between 20 to 100 microns in diameter and each coated by a 0.5 to 10 micron coating of a helium gas-impervious material, the addition of a predetermined weight percent of said boron carbide particles to said fuel composition acting to delay the burn out rate of said fuel composition by an amount which would require the addition of a greater weight percent of gadolinium oxide than the weight percent of boron carbide particles added.

* * * * *